(No Model.)
P. L. MALTBIE.
REFRIGERATOR.
No. 259,028. Patented June 6, 1882.
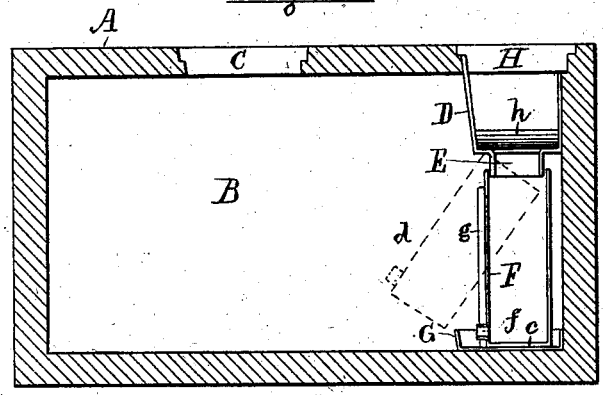
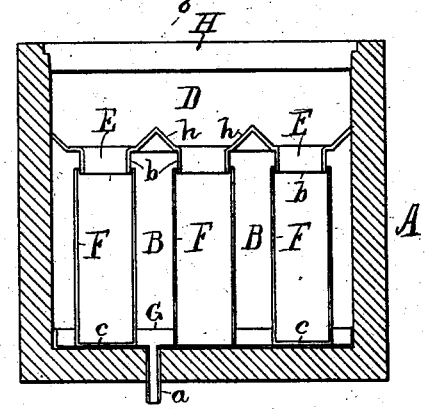
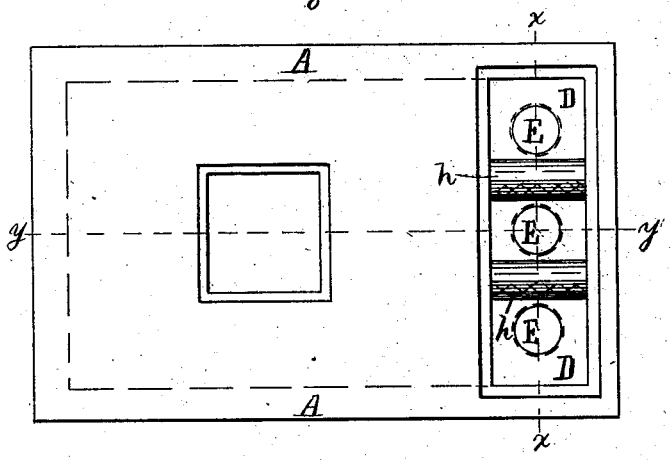
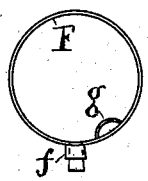
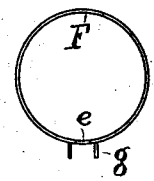
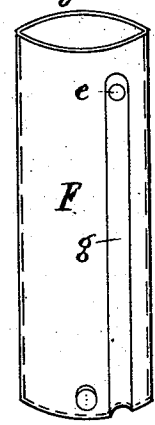
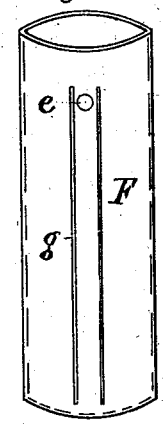
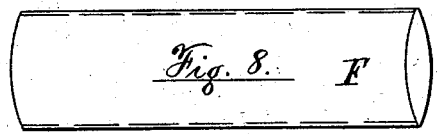
Attest:
Chas. D. Kennon
Wm. F. D. Crane
Inventor.
Paul L. Maltbie, per
Thos. S. Crane, Atty.

UNITED STATES PATENT OFFICE.

PAUL L. MALTBIE, OF NEWARK, NEW JERSEY.

REFRIGERATOR.

SPECIFICATION forming part of Letters Patent No. 259,028, dated June 6, 1882.

Application filed March 25, 1882. (No model.)

*To all whom it may concern:*

Be it known that I, PAUL L. MALTBIE, a citizen of the United States, residing in the city of Newark, county of Essex, and State of New Jersey, have invented certain new and useful Improvements in Refrigerators, fully described and represented in the following specification and the accompanying drawings, forming a part of the same.

This invention relates to that class of refrigerators in which a low temperature is secured by feeding crushed ice into a hopper or receiver in the upper part of the store-chamber and permitting it to work down into ice-tubes penetrating into or through the said chamber for the purpose of exposing a large cooling-area to the interior of the chamber. The construction is especially adapted for use with ice and salt or other freezing-mixtures, and by their use is capable of freezing the entire contents of the chamber, if properly proportioned to the ice-tubes.

The improvement consists, first, in making the cooling-tubes removable; secondly, in forming them with closed bottoms and operating them to retain the dissolved mixture until full; thirdly, in combining with the closed tube a plug or outlet at the bottom; and, fourthly, in combining with such closed tube an overflow-aperture at or near the upper end, and guides forming a channel to lead the overflow directly downward.

The invention will be understood by reference to the annexed drawings, in which Figure 1 is a section lengthwise of a refrigerator provided with my improvements, the same being taken on line *x x* in Fig. 3. Fig. 2 is a cross-section of the same at the center of the ice-tubes, the view being taken on line *y y* in Fig. 3, which is a plan of the refrigerator with the two lids or doors removed. Fig. 4 is a plan and Fig. 5 a side view of one of the ice-tubes formed with a closed bottom, and having an overflow-hole formed at the upper end of a channel sunk in the side of the tube. Fig. 6 is a plan and Fig. 7 a side view of a similar tube, having the channel or guides formed by projecting strips; and Fig. 8 is a side view of a plain tube with open bottom and top.

A is the box or body of the refrigerator, forming a chamber, B, which may be entered by a lid or door, C, upon the top, or at any other desired point. When located upon the top, as shown, it does not permit the escape of the cold air when opened.

D is the ice-receiver, fitted into the top of the box A, and communicating with the interior of the chamber B solely by the openings E, through which the ice passes into the ice-tubes F. The latter are shown as three in number, and extending from the bottom of the receiver to the floor of the box, with their lower ends resting in a water or waste tray, G, which is provided with a waste-pipe, *a*, as usual. The tubes are kept in place under the openings E by nozzles *b*, secured to the lower side of the receiver, the nozzles also serving to lead the ice straight to the tubes, and preventing it from slipping or leaking outside of the tubes. The tubes, being made a little shorter than the space between the floor of the box and the receiver, may be raised a little for removal, and drawn away from the tray G in an inclined position, as shown in dotted lines at *d* in Fig. 1. The tubes may be used with the bottom closed, as at *c* in Figs. 2 and 5, or open, as in Fig. 8, the dirt and sediment from the ice serving to pack the lower end after it has been in use a short time.

The operation of an open tube is as follows: The receiver and tubes being filled with a mixture of ice and salt, the lid H of the receiver is closed and the ice begins to melt. The first products settle to the bottom of the tube, where the liquid escapes by the narrow crack at the bottom of the tube, where it rests in the tray G and the solids collect inside the crack and soon fill it sufficiently to retain the contents until the tube is partly filled with liquid, when the latter breaks through the joint and partly escapes. I have found that with this construction the same amount of ice was much more effective than if the tube had an open outlet at the bottom to afford a free escape for all the melted products, and I have therefore employed the closed tube shown in Figs. 4 to 7, and at *c* in Fig. 2, to secure the retention of the fluid at a positive level while the ice is melting continuously. Such tubes I form with an opening, e, near the top to permit the escape of the liquid when it fills up to that level, and provide an outlet and plug near the bottom, at f, to empty the tube when desired. With this construction an intense cold can be readily produced and the contents of the chamber frozen hard.

To prevent the liquid from freezing over any large portion of the tube's outer surface, and thus obstructing the contact of the air with the cold metal, I form a channel or passage, g, down the side of the tube, to or near the tray G, and thus lead the fluid directly to the tray, without permitting it to spread over the outside of the tube. The channel may be formed by creasing in the surface of the tube, as in Figs. 4 and 5, or by projecting strips, as shown in Figs. 1, 6, and 7.

In Fig. 2 the bottom of the receiver D is shown formed with transverse ridges h h, located between the holes E, and serving the double purpose of strengthening the bottom and directing the crushed ice toward the openings. Such a construction is a very important aid in keeping the receiver clean, as the sloping sides of the ridges tend to lead everything toward the several openings, h, and thus prevent the lodgment of dirt in the receiver. As the effect would be the same if the ridges were made separately and placed in the proper positions inside the receiver, I do not limit myself to the precise construction shown, as by bending the bottom upward at intervals the same result is attained.

I am aware that ice-tubes with open ends have been used before in a refrigerator, as in Keech's Patent No. 233,772, of October 26, 1880; but such tubes are not filled with crushed ice, but are meant to operate by conducting a current of air constantly upward into and through the large blocks of ice used in the receiver. For this purpose the tubes are provided with feet to lift their lower ends up from the waste-tray and permit the air a free entrance, while in my invention the air is excluded from the tubes and the melted products of the crushed ice with which they are filled are retained inside them by closing the bottom in either of the modes described. The use of such crushed ice is much more economical than that of large blocks, as I find that the waste or broken ice from barges is quite suitable for such a purpose and much cheaper than solid blocks.

It is evident from the above that the function of my tubes is entirely different from that shown in the patent referred to, mine serving as reservoirs of ice and water, and being entirely closed to the passage of air, while Keech's serve entirely as air-passages, and operate, in conjunction with holes b, formed along the upper edge of his receiver and opening into the food-chamber, to maintain a current of air in motion through the ice in the receiver. I have discovered that such air-openings b permit the loss of much cold air when the receiver is opened for replenishing, and that the discharge of the melted products at a low temperature is also a great loss of ice.

I therefore make my receiver with no communication to the food-chamber, and close up my ice-tubes to retain the melted products, discharging the warmer portion of the same automatically from an aperture high up in the tube in the manner described above.

I am also aware that the telescopic tubes used in the said Keech's patent have been arranged to lift up a distance from their support in the tray with the intention of thereby gaining access to the lower ends to remove the dirt; but as the conducting power of the tubes is greatly impaired by the slimy accretions formed upon both their sides it is very essential that the same should be thoroughly cleansed to maintain the utmost efficiency; and such cleansing cannot be effectually done while the tubes are in position without a prolonged opening of the refrigerator. The latter must therefore be cleaned periodically and the contents exposed to injury by a rise of temperature, or the cleaning postponed or neglected and the efficiency of the device greatly impaired.

By making the tubes removable, as shown, any of them can be taken out in a few minutes, the opening E above the tube being closed by a piece of board, when filling the receiver, prior to such removal. By thus removing the tube and cleaning it outside of the refrigerator both its inner and outer surfaces can be properly washed and scraped and fitted to conduct the heat most effectively. By removing the tubes one at a time upon different occasions the temperature of the chamber can be preserved at about its normal rate by the remaining tubes, and the contents thus escape all injury.

Having thus fully set forth the nature and operation of my invention, I do not limit myself to the exact construction shown, but claim the same, as follows:

1. The combination, with the receiver D, provided with openings E and nozzles b, and the water-tray G for receiving the melted ice, of the removable ice-tubes F, formed with tight bottoms, or closed by resting in close contact with the tray, and operating to cool the air of the refrigerator by the exposure of their cold outer surfaces, substantially as herein shown and described.

2. The combination, in a refrigerator, of the receiver D, provided with openings E and nozzles b, and the ice-tubes formed with closed bottoms c, substantially as shown and described.

3. The combination, in a removable ice-tube having a closed bottom, of an overflow-opening near the top and an emptying-outlet near the bottom, as and for the purpose set forth.

4. The combination, in an ice-tube having a closed bottom, of an overflow-outlet and guiding-channel, arranged and operating as described.

5. The combination, with the removable ice-tubes F and an ice-receiver, D, having openings E in the bottom for conducting the ice to the tubes when fed with crushed ice, as herein described, of the ridges h for directing the crushed ice into the openings, substantially as shown and described.

In testimony whereof I have hereunto set my hand in the presence of two subscribing witnesses.

PAUL L. MALTBIE.

Witnesses:
   THOS. S. CRANE,
   WM. F. D. CRANE.